No. 699,724. Patented May 13, 1902.
W. THOMPSON.
EXTENSION SLIDE FOR TABLES, &c.
(Application filed Apr. 20, 1901.)
(No Model.)
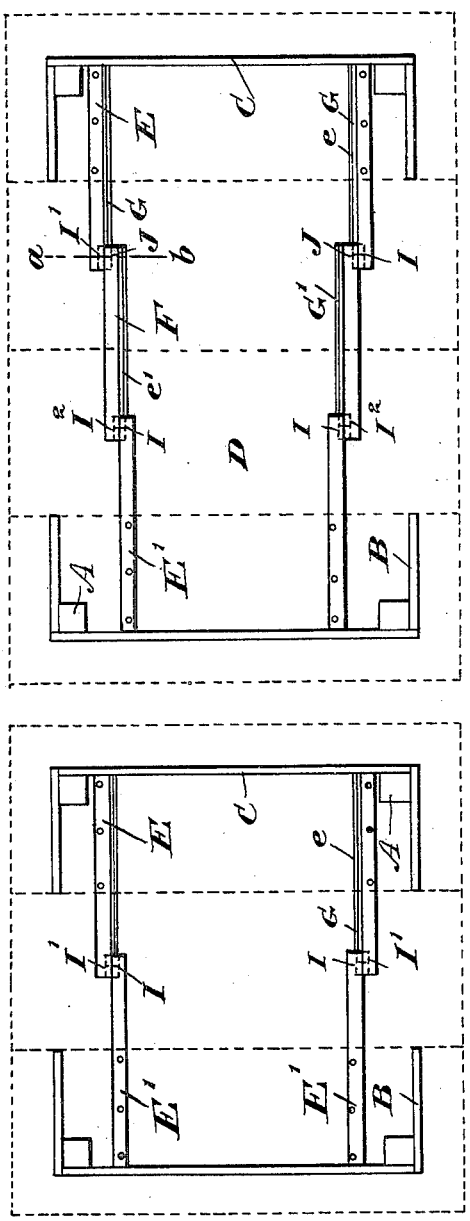
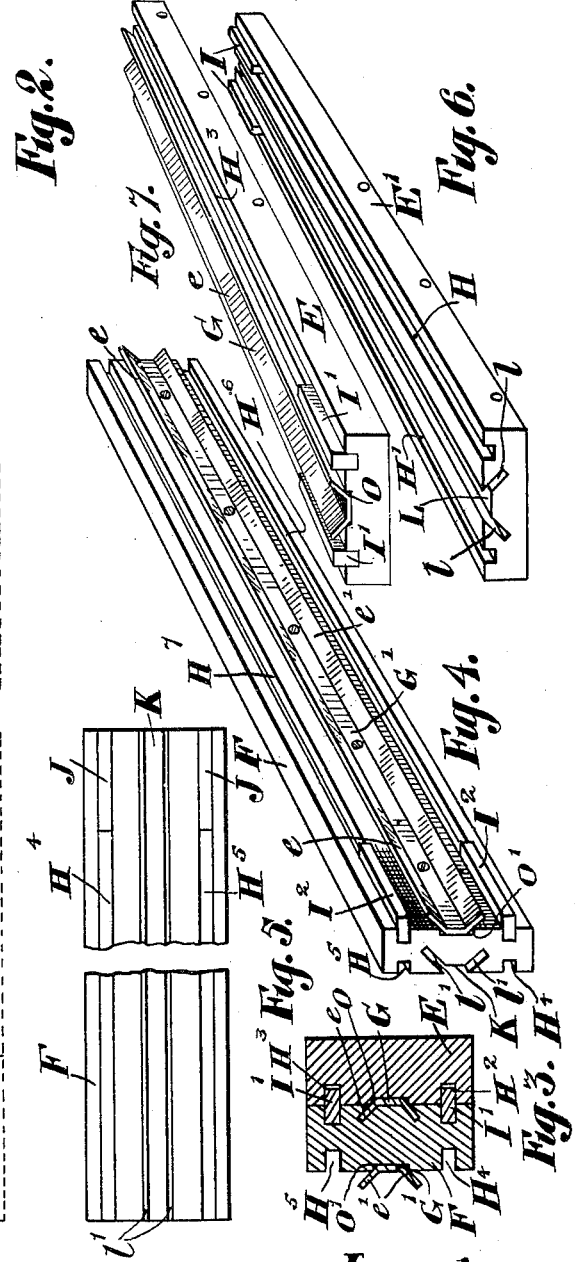
Witnesses.
L. C. Reynolds.
J. H. McDonald.
Inventor:
William Thompson,
by Egerton R. Case,
Atty.

UNITED STATES PATENT OFFICE.

WILLIAM THOMPSON, OF BELLEVILLE, CANADA.

EXTENSION-SLIDE FOR TABLES, &c.

SPECIFICATION forming part of Letters Patent No. 699,724, dated May 13, 1902.

Application filed April 20, 1901. Serial No. 56,739. (No model.)

*To all whom it may concern:*

Be it known that I, WILLIAM THOMPSON, a subject of the King of Great Britain, and a resident of the city of Belleville, in the county of Hastings, Province of Ontario, Canada, have invented certain new and useful Improvements in Extension-Slides for Tables and other Purposes, of which the following is a specification.

My invention relates to improvements in extension-slides for tables and other purposes; and the object of my invention is to design an extension-slide that will allow ready and only longitudinal movement of its members; and it consists, essentially, in providing some of the members of the slide with a suitably-shaped longitudinal groove in which has movement a piece secured to the adjacent member shaped to correspond with the shape of the said longitudinal groove and providing in each member of the slide and on each side of said longitudinal grooves and on each side of said pieces corresponding in shape to said longitudinal grooves a longitudinal groove and securing means in each of said side-placed longitudinal grooves, so as to prevent the members of the slide from being pulled apart longitudinally and also to prevent sagging of said members, as hereinafter more particularly explained.

Figure 1 is a plan view of a table, parts being dotted in, showing my extension-slide composed of two pieces attached thereto. Fig. 2 is a plan view of a table, parts being dotted in, showing my extension-slide composed of three members attached thereto. Fig. 3 is a vertical cross-section on the line *a b*, Fig. 2. Fig. 4 is an enlarged perspective view of a middle member of my slide. Fig. 5 is a plan view of portion of the opposite side of the member shown in Fig. 4. Fig. 6 is an enlarged perspective view of one of the end members of my extension-slide. Fig. 7 is an enlarged perspective view of one of the end members of my extension-slide, showing same provided with a channel-piece.

In the drawings like letters of reference indicate corresponding parts in each figure.

A represents the legs of the table, to which the usual side pieces B and end pieces C are secured.

D represents the leaves of the table, which are shown dotted.

E E' are the members of my extension-slide suitably secured to the end pieces or leaves of the table, as by screws. I am now describing my slide when same is composed of only two members. Suitably secured to the member E is a channel-piece G, made of metal, provided with outwardly-flaring flanges $e$. Running parallel with the channel-piece G and on each side of same in the member E and for the whole length of same are two suitably-shaped grooves $H^2$ and $H^3$. The member E' is provided with two grooves H and H', which run parallel with the grooves $H^2$ and $H^3$ in the member E. The said grooves H and H' run for the whole length of the member E'. Secured in the grooves H, H', $H^2$, and $H^3$ of each of the members E' and E and only in one end of each groove, so as to allow the greatest amount of longitudinal movement of these two members, are blocks I and I'. The blocks I of the member E' operate in the grooves $H^2$ and $H^3$ of the member E, and the blocks I' of the member E operate in the grooves H and H' of the member E'. Consequently it will be seen that these blocks abut against each other when the members E and E' are in the position shown in Fig. 1 and prevent the said members from being pulled apart longitudinally.

L is a compound groove in the member E', which is provided with side grooves $l$, in which operate the flanges $e$ of the channel-piece G. These side grooves $l$ are cut at an angle corresponding to the angle of the flanges $e$, so that these flanges may operate therein. By means of the outwardly-flared flanges $e$ and side grooves $l$ it will be readily understood that the said members E and E' will have free longitudinal movement, but will not have movement at right angles to each other. It will be readily understood from the drawings how the members E and E' are fitted together and operate. These two members are shown separately in Figs. 6 and 7 and are shown in sliding contact in Fig. 1. It will of course be understood that I use two sets of extension-slides in connection with a table, as shown in the drawings. When I wish to make up my extension-slide of a greater number than two members, I must of course add inner or compound members to the slide, constructed as I shall now describe. In Fig. 2 I show three members in my slide; but of course I can use any desired number in same.

F is an inner member.

H⁴ and H⁵ are two grooves in the member F, running the whole length of same parallel with the grooves H, H′, H², and H³ in the members E and E′. At one end of these grooves are blocks J. (See Fig. 5.) The blocks I′ of the member E operate in the grooves H⁴ and H⁵ in the member F. The blocks J of the member F operate in the grooves H² and H³ of the member E. Consequently it will be seen that these said blocks will abut against each other when the members E and F are in the position shown in Fig. 2 and prevent the said members from being pulled apart longitudinally.

K is a compound groove in the member F, provided with two side grooves l′, running parallel with the grooves H⁴ and H⁵ and for the whole length of the said member. The channel-piece G of the member E operates in the compound groove K, and the flanges e of said channel-piece operate in the side grooves l′.

G′ is a channel-piece provided with flaring flanges e′, secured to the member F. Running parallel with the channel-piece G′ and on each side of same in the member F and for whole length of same are two suitably-shaped grooves H⁶ and H⁷. Secured in and at one end of the grooves just mentioned in the member F are two blocks I². The blocks I² operate in the grooves H and H′ of the member E′, and the blocks I operate in the grooves H⁶ and H⁷. Consequently it will be understood that these said blocks abut against each other when the members E′ and F are in the position shown in Fig. 2 and prevent the said members from being pulled apart longitudinally.

Before I secure the channel-pieces G and G′ to the members E and F, I cut for the whole length of said members in said members channels O and O′, the sides of which are parallel with the side grooves H² H³ and H⁴ and H⁵. The channels O and O′ are also parallel with the grooves H and H′. These grooves I find enable me to quickly and accurately secure the channel-pieces G and G′ to their respective members, with their flanges e and e′ parallel with the side grooves above mentioned. I may dispense with the grooves O and O′, if I wish, and obtain the parallel position of the flanges e and e′ to the grooves before mentioned in the several members of my slide by any of the well-known means; but I preferably use the grooves O and O′, for the reasons stated.

The member F is really, as will be seen, a double member—that is, if I were to place the members E and E′ back to back I would make the member F. It will readily be seen from the drawings and understood from this specification that I must necessarily use members similar to the member F when I construct my extension-slide with more than two members.

In the drawings I have shown the channel-pieces G and G′ as extending the whole length of a member; but it will of course be understood that I may make the said channel-pieces of any desired length. The object of the longitudinal grooves in the several members and the blocks therein is to (besides preventing the said members from being pulled apart longitudinally) prevent sagging and binding of the channel-pieces G and G′ in the compound grooves L and K, as will be understood. The length of the several blocks in the said grooves before mentioned is of course sufficient to give the required bearing of same in the several grooves in which they operate. It will be seen from Fig. 3 that the depth of the said blocks is such as will prevent them from coming in contact with the bottoms of the several longitudinal grooves in which they operate, and thus reduce friction as much as possible. In the drawings, I have shown the longitudinal grooves in the several members as being square or rectangular in shape; but it will of course be understood that the same may be constructed in any suitable shape. I do not confine myself to the shape of the grooves K or L and the tongue or piece operating therein so long as said grooves are of such shape as will only permit longitudinal movement of the said tongue or piece therein when used in combination with two side grooves, such as H and H′, each side groove being placed one on each side of said longitudinal grooves K or L and said tongues or pieces operating therein, the said side grooves being provided with blocks or tongues in one end of same, as before described.

What I claim as my invention, and desire to secure by Letters Patent, is—

1. In an extension-slide comprising two members, the combination with a first member provided, for its whole length, with a compound groove, clear of obstruction, countersunk therein, the same being provided with two outwardly-flared grooves, a side groove on each side of said compound groove and parallel therewith, formed in said first member for its whole length, the said side grooves designed to receive blocks which operate therein, and a second member provided, for its whole length, with a countersunk central channel parallel with its sides, a channel-piece rigidly secured in said channel and provided with outwardly-flared flanges, the same having movement in the outwardly-flared grooves of said compound groove, and a side groove on each side of said channel-piece and parallel with the same, formed in said second member for its whole length, the said side grooves of said second member designed to receive blocks which operate therein, of a pair of blocks rigidly secured in one end of each of the side grooves of said first member, and another pair of blocks rigidly secured in one end of each of the side grooves of said second member, the blocks in the side grooves of said first member operating in the side grooves of said second member, and the blocks of said second member operating in the side grooves of said first member, the said blocks operating in their respective grooves in order to prevent the said members from sagging and binding, the said blocks further abutting, as described, in order to prevent the said members from being pulled apart longitudinally.

2. In an extension-slide comprising a series of members, the combination with one end member provided, for its whole, length, with a compound groove, clear of obstruction, countersunk therein, the same being provided with two outwardly-flared grooves, a side groove on each side of said compound groove, formed in said one end member, for its whole length and parallel with said compound groove, the said side grooves designed to receive blocks which operate therein, the central members, the same being provided, for their whole length, with a countersunk central channel parallel with its sides, a channel-piece rigidly secured in said channel and provided with outwardly-flared flanges, the same having movement in the outwardly-flared grooves of the compound groove of said one end member, a side groove, on each side of said channel-piece, formed in said central members, for their whole length, the same being parallel with said channel-piece, the said side grooves, on each side of said channel-piece, designed to receive blocks which operate therein, the said central members being further provided, on their opposite side and for their whole length, with compound grooves clear of obstruction, countersunk therein, the same being provided with two outwardly-flared grooves, a side groove on each side of said countersunk compound grooves in said central members, and parallel therewith, the said side grooves designed to receive blocks which operate therein, and another end member provided for its whole length with a countersunk central channel parallel with its sides, a channel-piece rigidly secured in said central channel of said other end member and provided with outwardly-flared flanges, the same having movement in the outwardly-flared grooves of one of said central members, a side groove on each side of said channel-piece, formed in said other end member for its whole length and parallel with said outwardly-flared grooves of said central members, the said side grooves designed to receive blocks which operate therein, of a first pair of blocks rigidly secured in one end of each of the side grooves of said one end member, a second pair of blocks rigidly secured in one end of each of the side grooves formed on each side of the channel-piece of said central members, the second pair of blocks operating in the side grooves in which the first pair of blocks are secured, the first pair of blocks operating in the side grooves in which the second pair of blocks are secured, a third pair of blocks rigidly secured in one end of each of the side grooves formed in said central members on each side of the compound groove formed therein, and a fourth pair of blocks rigidly secured in one end of each of the side grooves of said other end member, the third pair of blocks operating in the side grooves in which the fourth pair of blocks are secured, and the fourth pair of blocks operating in the side grooves in which the third pair of blocks are secured, the said pairs of blocks operating in their respective grooves in order to prevent the said members from sagging and binding; the said blocks further abutting, as described, in order to prevent the said members from being pulled apart longitudinally.

In testimony whereof I have signed my name to this specification in the presence of two subscribing witnesses.

WILLIAM THOMPSON.

Witnesses:
EGERTON R. CASE,
LAWRENCE C. REYNOLDS.